(12) United States Patent
Gupta et al.

(10) Patent No.: US 10,095,545 B1
(45) Date of Patent: Oct. 9, 2018

(54) AUTOMATED AND CONFIGURABLE FLEET REFRESH

(71) Applicant: Amazon Technologies, Inc., Seattle, WA (US)

(72) Inventors: Diwakar Gupta, Seattle, WA (US); Robert Beazley, Seattle, WA (US); Alexey Gadalin, Kirkland, WA (US); Mihir Sadruddin Surani, Seattle, WA (US); Scott Sikora, Seattle, WA (US); Anton Valter, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 15/280,766

(22) Filed: Sep. 29, 2016

(51) Int. Cl.
*G06F 9/48* (2006.01)
*G06F 9/455* (2018.01)

(52) U.S. Cl.
CPC ........ *G06F 9/4881* (2013.01); *G06F 9/45558* (2013.01); *G06F 2009/45562* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 8,522,228 B1* | 8/2013 | Le | G06F 8/61 717/168 |
| 2006/0117310 A1* | 6/2006 | Daniels | G06F 8/658 717/168 |
| 2014/0337862 A1* | 11/2014 | Valencia | G06F 8/71 719/313 |
| 2016/0147556 A1* | 5/2016 | Hu | G06F 9/45558 718/1 |
| 2016/0266890 A1* | 9/2016 | Aleksandrov | G06F 8/65 |
| 2017/0076235 A1* | 3/2017 | Noto | G06Q 10/06314 |

* cited by examiner

*Primary Examiner* — Charlie Sun
(74) *Attorney, Agent, or Firm* — Davis Wright Tremaine LLP

(57) ABSTRACT

Techniques for managing large-scale automatic fleet refresh operations are described herein. An application programming interface request to perform a refresh operation on a set of computer system instances is received. The application programming interface request includes a set of constraints for performing the refresh operation which are used to determine the impact of performing the refresh operation. Based at least in part on the impact, a set of schedules for performing the refresh operation is provided.

20 Claims, 11 Drawing Sheets

AUTOMATED AND CONFIGURABLE FLEET REFRESH

BACKGROUND

Modern computer systems are frequently implemented as virtual computer systems operating collectively on one or more host computer systems. The virtual computer systems may utilize resources of the host computer systems such as processors, memory, network interfaces, and storage services and may have a variety of software running on the virtual computer systems. When the underlying hardware of the host computer system changes as a result of, for example, a new processor becoming available, or when software is updated on the virtual computer system, or when a new operating system version becomes available for the virtual computer system, the virtual computer system may be updated or refreshed.

Issuing commands to a small number of virtual computer systems to initiate such refresh operations can be a relatively simple task, but when a user has a large number of such virtual machine instances to refresh, the task can be considerably more difficult, particularly when, as is typical, a user may have a heterogeneous environment, with multiple hardware types, multiple operating systems, multiple versions of those operating systems, and a variety of software related to the tasks performed on the virtual computer system instances. Manually connecting to each instance to determine what refresh operations should be performed on that particular instance based on the configuration and/or underlying hardware of the virtual machine instance would take a significant amount of time. Furthermore, this manual refresh process can take a significant amount of time, during which the ability of a user to interact with the virtual computer system during that time period may be eliminated or at least severely restricted. Such a manual refresh may also lead to the possibility of out of date virtual machine instances with security vulnerabilities, outmoded operating systems, or out of date software, leading to decreased security of a virtual machine instance and a degraded customer experience.

BRIEF DESCRIPTION OF THE DRAWINGS

Various techniques will be described with reference to the drawings, in which.

DETAILED DESCRIPTION

Figure 1:
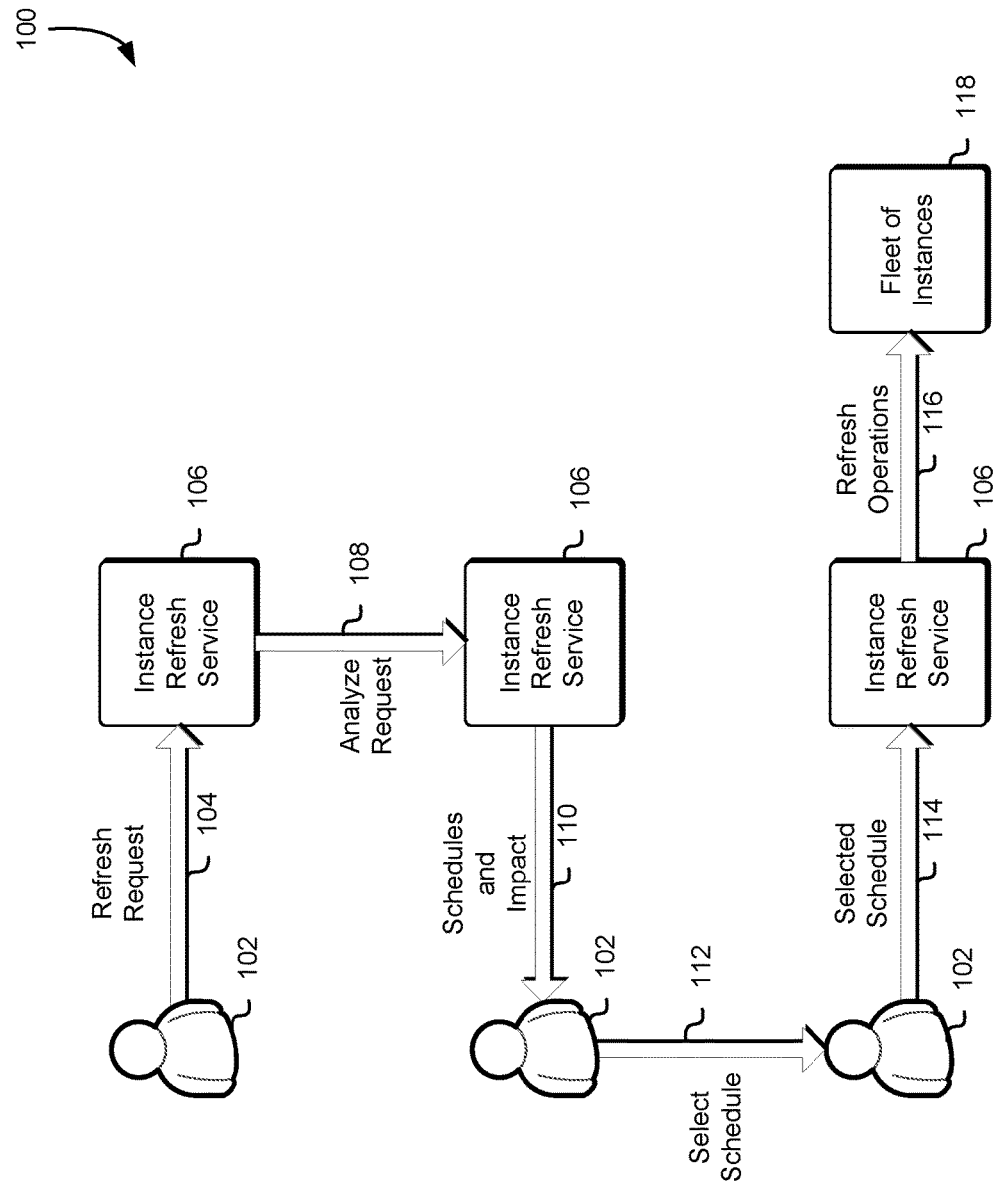
FIG. 1 illustrates an example environment where a fleet of virtual machine instances is refreshed using an instance refresh service.

The following disclosure describes techniques for managing refresh operations for a large fleet of computer system instances. When a large number of virtual machine instances are operating in a computing resource service provider environment, those virtual machine instances may need to be updated on a regular or periodic basis. For example, when hardware changes, software changes, or security patches are issued, the virtual machine instances are updated accordingly. In another example, periodically it may be efficient to rebuild a virtual machine instance completely, installing the most recent operating system, the most recent software, and any patches. Typically, tools exist to perform such refresh operations on individual virtual machine instances, but performing such refresh operations on hundreds, thousands, or millions of virtual machine instances is a significantly more complex problem.

A customer can request a refresh of a fleet of computer system instances belonging to that customer, but managed by a computing resource service provider. For example, when a new version of an operating system is released, the customer may wish to update the instances in the customer's fleet of computer system instances to that new version of the operating system. In order to perform this refresh operation, the computing resource service provider would perform operations to analyze the fleet of computer system instances to determine which instances are candidates for the new operating system. Virtual machine instances running a different operating system may not need to be updated and virtual machine instances that are already running the new version of the operating system also may not need to be updated.

After determining the candidate set of virtual machine instances to update (i.e., the working set for the refresh operation), the computing resource service provider would next determine the impact of performing such a refresh operation. First, the computing resource service provider analyzes a set of constraints provided by the customer related to the refresh operations. For example, a customer can specify a minimum number (or a minimum proportion) of the virtual machine instances in the fleet (e.g., the entire fleet or a sub-group of instances in the fleet) that should remain running during the refresh operations. The customer can also specify that the refresh operations should complete within a certain time period. Additionally, the customer can limit the amount of new instances (i.e., temporary instances) that may be used during the refresh operations.

These constraints can introduce constraint conflicts. For example, a customer might request that one-hundred virtual machine instances all be refreshed during a one-hour window, that ninety-five is the minimum number of virtual machine instances that can be available during that window (i.e., that no more than five instances can be unavailable at any one time), that no new instances can be temporarily added to the fleet. If the refresh operation takes six minutes to complete on each virtual machine instance, then it is not possible to complete the requested operations within the constraints. In fact, the fastest that such a refresh operation could be completed with those constraints is two hours.

The computing resource service provider resolves this constraint conflict in one or more of a number of ways. For example, the computing resource service provider could complete the refresh request in the one hour time window by refreshing ten virtual machine instances at a time (i.e., by relaxing the ninety-five machine constraint). The computing resource service provider could complete the refresh request in the one-hour time window by adding temporary virtual machine instances to the fleet (i.e., by relaxing the constraint on adding temporary virtual machine instances). The computing resource service provider could also relax the one-hour window time constraint and could complete the refresh request in two hours. The computing resource service provider could also use a combination of such options to resolve constraint conflicts in the request.

Next, the computing resource service provider might analyze the candidate instances themselves to determine the impact of performing refresh operations. For example, the computing resource service provider might look at the type and location of the virtual machine instances, what they are used for, how loaded they typically are, what times they may be less loaded, whether additional virtual machine instances might be used to mitigate lost capacity, and whether a live migration possible (i.e., a migration that runs with minimal impact).

In addition, the computing resource service provider might also analyze the type of refresh operation that is being requested to determine any additional impact of performing refresh operations. A refresh operation that patches an infrequently used application on a virtual machine instance has less impact than installing a new operating system. The patch operation could be performed while the instance is running and may only pause processes for a small number of users of the virtual machine instance for a very short time. Installing a new operating system might cause all users to be migrated to a new virtual machine instance before terminating the virtual machine instance, updating it, testing it, and finally making it available for use. A refresh operation to install a new operating system has a larger individual impact and, if such a refresh operation is being performed on an entire fleet, has a considerably larger aggregate impact.

After the computing resource service provider has determined the impact of the refresh operation, the computing resource service provider can provide the user with one or more schedules for the refresh operations, the constraints that those schedules might not conform to, the impact of each schedule, and any resource costs associated with each schedule. Presenting schedules and the impact of each schedule is a way for the customer to understand and manage the impact. By choosing a particular schedule and the associated impact, the customer can manage the impact of the refresh operation. For example, a customer can choose to use more resources to get the refresh done sooner, sacrifice more capacity to get the refresh done sooner, or allow the time window to be stretched to reduce costs or not sacrifice capacity. Based on the impact, the customer can choose a schedule and a corresponding impact for the refresh operation and the refresh operation can be performed according to the schedule.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a fleet of computer system instances is refreshed using an instance refresh service in accordance with an embodiment. A fleet of computer system instances may also be referred to herein as a "fleet of virtual machine instances" or simply as a "fleet." In the example environment 100 illustrated in FIG. 1, a customer 102 sends a fleet refresh request 104 to an instance refresh service 106. The customer 102 is a customer of a computing resource service provider. The customer 102 may be a person, an identity, or may be a process running on one or more remote computer systems, or may be some other computer system entity, user, or process as described herein.

The instance refresh service 106 may be a service provided by the computing resource service provider to allow a customer of the computing resource service provider to refresh virtual machine instances as described below. The computing resource service provider may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services, and/or other such services. Not all embodiments described include all of the services described and additional services may be provided in addition to, or as an alternative to, services explicitly described.

As an example, the computing resource service provider may be an entity that provides computing resources, such as data storage services, virtual computer system services, and/or web services. Customers of the computing resource service provider may communicate with one or more of the services via an interface, which may be a web services interface or any other type of customer interface. Each service provided by a computing resource service provider may have its own interface and subsets of the services may have corresponding individual interfaces in addition to, or as an alternative to, a common interface.

The refresh request 104 may be an application programming interface ("API") request that is sent by a client computing device of the customer 102 to the instance refresh service 106. The refresh request 104 may be sent by a client computing device of the customer 102 using a web-services interface, or using a console application, or using some other method. The refresh request 104 may also be generated using a user interface and may be subsequently sent by a client computing device of the customer 102 to the instance refresh service 106.

A refresh request 104 may include a set of virtual machine instances in the customer's fleet that should be refreshed and a set of one or more constraints that should be satisfied when performing the refresh operation, both as described herein. For example, a refresh request 104 may specify that all virtual machine instances in a customer's fleet should be updated to the latest version of the Secure Socket Layer ("SSL") software because of, for example, a new security patch that addresses a security vulnerability. The refresh request 104 may also specify a set of constraints. For example, the refresh request 104 may specify that only a maximum of ten percent of the virtual machine instances in the fleet can be unavailable at any time, that the refresh should occur between midnight and five AM of the next day, and that no new resources (i.e., temporary instances) should be used. In embodiment, a constraint may be a cost constraint that specifies the maximum resource cost of additional resources used to perform the refresh operation (e.g., in monetary terms).

The instance refresh service 106 may be a collection of computing resources that operate collectively to receive, analyze, and refresh fleet requests such as the refresh request 104 on fleets of virtual machine instances and to perform those fleet refresh operations. The computing resources configured to receive, analyze, and process refresh fleet requests on fleets of virtual machine instances and to perform those fleet refresh operations include at least one of: computer systems (the computer systems including processors and memory), networks, storage devices, executable code, services, processes, modules, or applications. The computing resources configured to receive, analyze, and process refresh fleet requests on fleets of virtual machine instances and to perform those fleet refresh operations may include virtual systems that are implemented on shared hardware hosted by, for example, a computing resource service provider. The instance refresh service 106 may be implemented as a single system or may be implemented as a distributed system, with a plurality of instances operating collectively to receive, analyze, and process refresh fleet requests on fleets of virtual machine instances and to perform those fleet refresh operations. The instance refresh service 106 may operate using computing resources (e.g., other services) that enable the instance refresh service 106 to receive, analyze, and process refresh fleet requests on fleets of virtual machine instances and to perform those fleet refresh operations.

The instance refresh service 106 may next analyze the request 108 as described herein to determine the potential impact of the request and may deliver the schedules and impact 110 to the customer 102 so that the customer 102 may select a schedule 112 from the provided schedules, based at least in part on the provided impacts. Using the example above, the instance refresh service 106 may analyze the request 108 and, based on that analysis, may determine whether the constraints (i.e., that only a maximum of ten percent of the virtual machine instances in the fleet can be unavailable at any time, that the refresh should occur between midnight and five AM of the next day, and that no new resources (i.e., temporary instances) should be used) can be satisfied. If, for example, the update of ten percent of the virtual machine instances can be completed in thirty minutes, then the instance refresh service 106 may determine that the constraints can be satisfied and may offer a schedule for doing so. Conversely, if the update of ten percent of the virtual machine instances cannot be completed in thirty minutes, then the instance refresh service 106 may determine that the constraints cannot be satisfied and may offer an alternate schedule for doing so (e.g., one that takes more time, involves additional instances, or has diminished capacity). Finally, the customer 102 can provide the selected schedule 114 to the instance refresh service 106 and, the refresh operations 116 can be performed on the fleet of instances 118 in accordance with the selected schedule, also as described herein.

Figure 2:
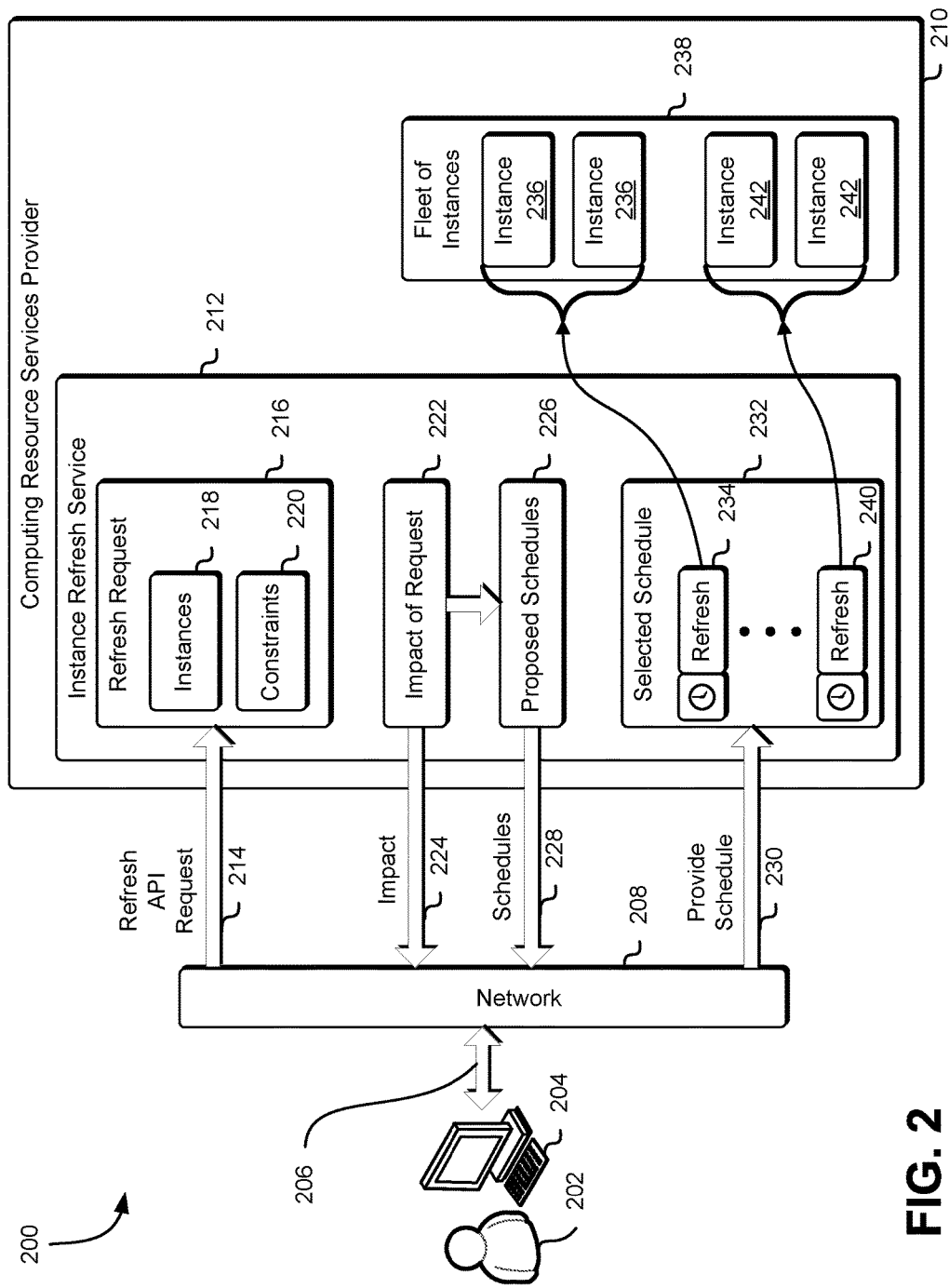
FIG. 2 illustrates an example environment where a customer requests a refresh of a fleet of virtual machine instances using an instance refresh service.

FIG. 2 illustrates an example environment 200 where a customer requests a refresh of a fleet of virtual machine instances using an instance refresh service, as described in connection with FIG. 1, and in accordance with an embodiment. In the example environment 200 illustrated in FIG. 2, a customer 202, which may be the same as the customer 102 described above, may use a client computing device 204 to connect 206 to a variety of services provided by a computing resource service provider 210. The customer 202 may use the client computing device 204 to connect 206 to the computing resource service provider 210 over a network 208 such as those networks described herein. The computing resource service provider 210 may provide a distributed, virtualized, and/or datacenter environment within which one or more applications, processes, services, virtual machines, and/or other such computer system entities may be executed. The customer 202 may be a person, an identity, or may be a process running on one or more remote computer systems, or may be some other computer system entity, user, or process.

Commands from the customer 202 to the computing resource service provider 210 may originate from an outside computer system or from within the computing resource service provider environment. The commands to connect 206 to the computing resource service provider 210 may be sent to the computing resource service provider 210 and/or the services operating in the environment therein, without the direct intervention of the customer 202 (i.e., commands to connect 206 to the computing resource service provider 210 may be generated automatically in response to one or more events). The customer 202 may be a privileged user associated with a customer of the computing resource service provider 210. The customer 202 may also be a privileged user associated with the computing resource service provider 210.

The computing resource service provider 210 may provide access to one or more host machines, may provide access to one or more virtual machine instances as may be operating thereon, or may provide access to one or more services in an environment therein. The one or more services provided by the computing resource service provider 210 may also be implemented as and/or may utilize one or more virtual machine instances as may be operating on host machines operating within the computing resource service provider 210 environment. For example, the computing resource service provider 210 may provide a variety of services to users including, but not limited to, the customer 202 and the users may communicate with the computing resource service provider 210 via an interface, such as a web services, interface or any other type of interface. While the example environment illustrated in FIG. 2 shows a single connection or interface to the computing resource service provider 210, each of the services operating in an environment therein may have its own interface and, generally, subsets of the services may have corresponding interfaces in addition to or as an alternative to the single interface.

In an example of a type of service operating within the environment of the computing resource service provider 210, a virtual computer system service may be a collection of computing resources configured to instantiate virtual machine instances on behalf of a customer such as the customer 202. The customer may interact with a virtual computer system service (via appropriately configured and authenticated API requests) to provision and operate virtual machine instances that are instantiated on physical computing devices hosted and operated by the computing resource service provider 210. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

As described above, a customer 202 of a computing resource service provider 210 may first send a refresh API request 214 to an instance refresh service 212 operating within the computing resource service provider 210 environment. The refresh API request 214 may at least specify a set of instances 218 (also referred to herein as "a set of virtual machine instances") to refresh and a set of constraints 220 to satisfy. In an embodiment, the set of instances 218 specified in the refresh API request 214 is all of the instances associated with the customer 202 (i.e., the customer's fleet of instances). In another embodiment, the set of instances 218 specified in the refresh API request 214 is a set of all instances of the customer's fleet of instances that are of a specified type. In another embodiment, the set of instances 218 specified in the refresh API request 214 is a set of all instances of the customer's fleet of instances that perform a specified function. In another embodiment, the set of instances 218 specified in the refresh API request 214 is a set of all instances of the customer's fleet of instances that are members of a defined instance group. In another embodiment, the set of instances 218 specified in the refresh API request 214 is a set of all instances of the customer's fleet of instances that are hosted in a specified location. As may be contemplated, the examples of the sets of instances specified in the refresh API request are merely illustrative examples and other sets of instances specified in the refresh API request may be considered as within the scope of the present disclosure.

The set of constraints 220 to satisfy that are specified in the refresh request may include, for example, limits on time, resources, or capacity loss that may be allowed when performing the refresh operations. For example, a customer can specify a minimum number (or a minimum proportion) of the virtual machine instances in the fleet that should remain running during the refresh operations. The customer can also specify that the refresh operations should complete within a certain time period. Additionally, the customer can limit the amount of new instances (i.e., temporary instances) that may be used during the refresh operations.

The instance refresh service may next analyze the refresh request 216 to determine a set of impacts of the request 222 and also to determine one or more proposed schedules 226. Using the example from above, with a refresh request 216 that specifies that all virtual machine instances in a customer's fleet should be updated to the latest version of the Secure Socket Layer ("SSL") software because of, for example, a new security patch that addresses a security vulnerability and a set of constraints that specify that only a maximum of ten percent of the virtual machine instances in the fleet can be unavailable at any time, that the refresh should occur between midnight and five AM of the next day, and that no new resources (i.e., temporary instances) should be used, the impact of the request 222 may be that the ten percent of the virtual machine instances in the fleet will be unavailable between midnight and five AM of the next day and the one or more proposed schedules 226 may include a proposed schedule to refresh ten percent of the virtual machine instances of the fleet every half hour for five hours, assuming that it is possible to refresh ten percent of the virtual machine instances of the fleet every half hour for five hours.

Conversely, it may not be possible to refresh ten percent of the virtual machine instances of the fleet every half hour for five hours and the instance refresh service may instead generate a set of proposed schedules 226 that may include, for example, completing the refresh operation in eight hours, but maintaining all other constraints, completing the refresh operation in five hours, but with the addition of ten extra instances, completing the refresh operation in five hours, but with fifteen percent of the instances unavailable at one time. Each of these proposed schedules of the set of proposed schedules has a corresponding impact of the set of impacts of the request (i.e., three extra hours, ten extra instances, or five percent extra loss of capacity).

The instance refresh service 212 may then provide the impact 224 and provide the schedules 228 to the client computing device 204 of the customer 202 via the network 208 and the customer may then select a schedule based on the acceptable impact and provide the selected schedule 230 to the instance refresh service 212. In an embodiment, the selected schedule is chosen from one of the provided schedules 228 by the customer 202 using an API call. In another embodiment, the selected schedule is chosen from one of the provided schedules 228 by the customer 202 using a web services interface. In another embodiment, the selected schedule is chosen from one of the provided schedules 228 by the customer 202 using a user interface (a "UI").

The selected schedule 232 provided by the customer 202 to the instance refresh service may include a set of refresh operations to perform, each at a determined time. In the example illustrated in FIG. 2, a first set of refresh operations 234 is performed at a first time to refresh a set of instances 236 of a fleet of instances 238 and a second set of refresh operations 240 is performed at a second time to refresh a set of instances 242 of a fleet of instances 238.

It should be noted that while the virtual machine instances in the fleet of instances 238 are shown as being hosted by the computing resource service provider 210, in an embodiment, the virtual machine instances in the fleet of instances 238 are hosted in a customer environment and managed (e.g., refreshed) by the instance refresh service 212 of the computing resource service provider 210. In another embodiment, the virtual machine instances in the fleet of instances 238 are hosted in a third party environment (i.e., are not hosted in a customer environment and are also not hosted in the computing resource service provider 210 environment) and are managed (e.g., refreshed) by the instance refresh service 212 of the computing resource service provider 210. In yet another embodiment, the virtual machine instances in the fleet of instances 238 are hosted in a combination of a customer environment, a computing resource service provider 210 environment, or a third party environment.

Figure 3:
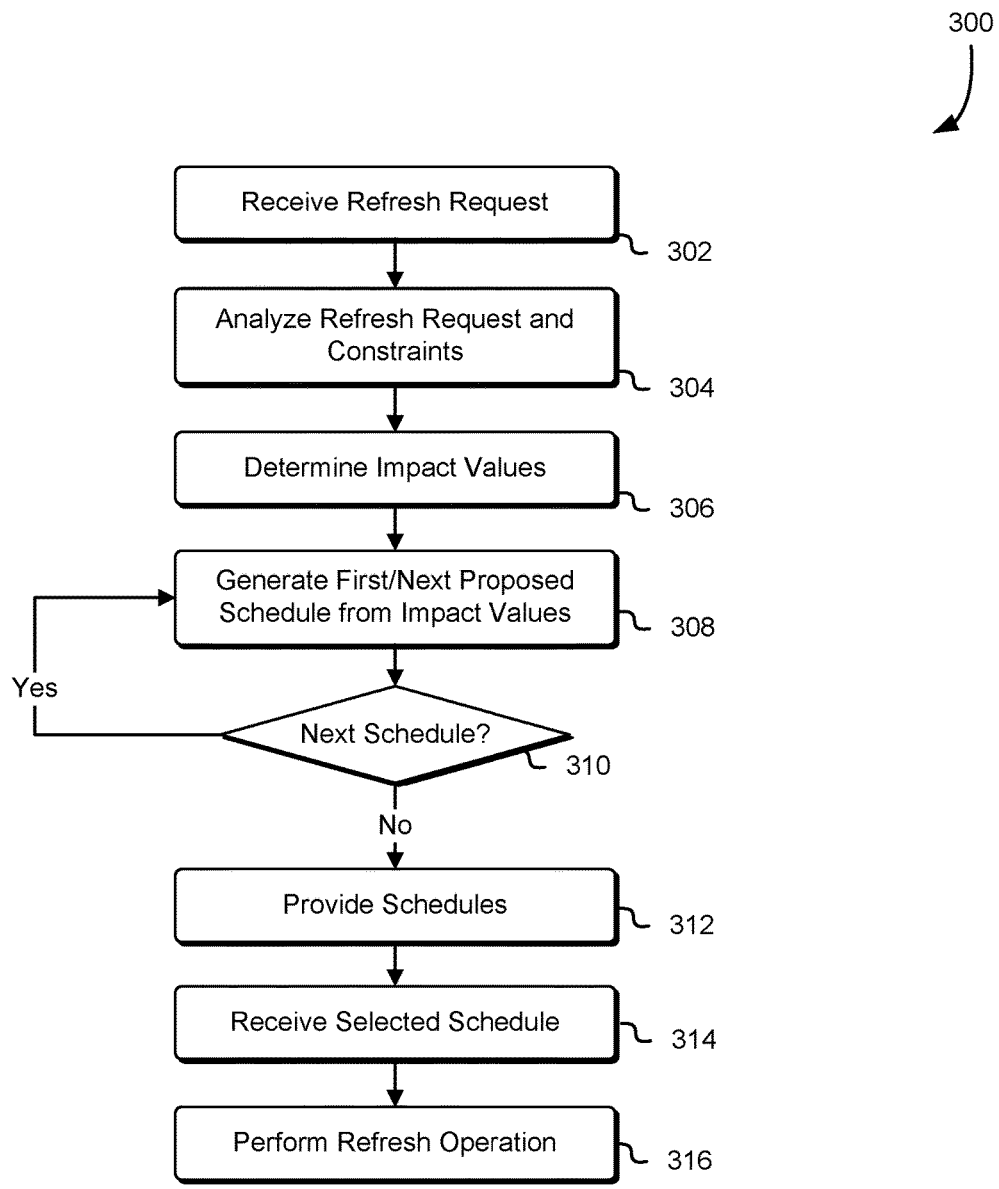
FIG. 3 illustrates an example process for refreshing a fleet of virtual machine instances using an instance refresh service.

FIG. 3 illustrates an example process 300 for refreshing a fleet of virtual machine instances using an instance refresh service, as described in connection with FIG. 1, and in accordance with an embodiment. An instance refresh service, such as the instance refresh service 106 described in connection with FIG. 1, may perform the example process 300 illustrated in FIG. 3. The instance refresh service may first receive 302 a refresh request as described above, with a set of instances to request and a set of constraints to satisfy. The instance refresh service may next analyze 304 the refresh request to determine 306 the individual impact values of the request.

The impact values of the request are the values that indicate the impact of performing the refresh operation specified in the refresh request. For example, the refresh operation can cause ten percent of the fleet to be unavailable at a time based on constraints specified in the refresh request. The impact value for such a request is an impact value on fleet capacity and is, in this example, a ten percent loss in fleet capacity. In another example, the refresh operation can take five hours (i.e., take place over a five hour period). The impact value for such a request is an amount of time to perform the refresh operation and is, in this example, five hours. In another example, the refresh operation can require ten additional instances to complete. The impact value for such a request is an amount of additional resources utilized to perform the refresh operation and is, in this example, ten additional instances.

The set of impact values may be used to prompt an adjustment of the constraints, as described herein, and those adjusted or altered constraints may then be used to determine updated impact values. For example, a first refresh request may result in a set of impact values where ten percent of a fleet of instances will be unavailable (e.g., an impact value on fleet capacity as a result of performing the refresh operation), that the refresh operation will take four hours (e.g., an amount of time to perform the refresh operation), and that no new instances are needed (e.g., an amount of additional resources utilized to perform the refresh operation). The customer can then adjust the constraints by, for example, allowing ten additional resources. The adjusted constraints may then reduce the impact value on the fleet capacity, or reduce the impact value on the amount of time, or reduce both the impact value on the fleet capacity and reduce the impact value on the amount of time.

Using the example from above, a refresh request may specify that all virtual machine instances in a customer's fleet should be updated to the latest version of the Secure Socket Layer ("SSL") software and a set of constraints that specify that only a maximum of ten percent of the virtual machine instances in the fleet can be unavailable at any time, that the refresh should occur between midnight and five AM of the next day, and that no new resources (i.e., temporary instances) should be used. If the constraints can be satisfied, the impact values are that ten percent of the virtual machine instances in the fleet will be unavailable between midnight and five AM of the next day. Conversely, if the constraints cannot be satisfied, the impact values may be different (i.e., that completing the refresh operation will take eight hours, or that completing the refresh operation can be completed in five hours, but with the addition of ten extra instances, or that completing the refresh operation may be completed in five hours, but with fifteen percent of the instances unavailable at one time).

The instance refresh service may then begin generating 308 one or more proposed schedules for each of the individual impact values. For example, if the above constraints can be satisfied (i.e., that the refresh operation can be performed on the entire fleet within five hours), then the proposed schedule may be to perform ten percent of the refresh operations every half hour for the five hours. Conversely, different schedules for the refresh operations may be provided. The instance refresh service may continue generating 308 one or more proposed schedules until it determines 310 that there are no more proposed schedules. When the instance refresh service does determine 310 that there are no more proposed schedules, the instance refresh service may then provide 312 the schedules and the corresponding impacts to the customer and, based on a received selected schedule 314 that is received from, for example, the customer, may perform 316 the refresh operations according to the received selected schedule 314.

Figure 4:
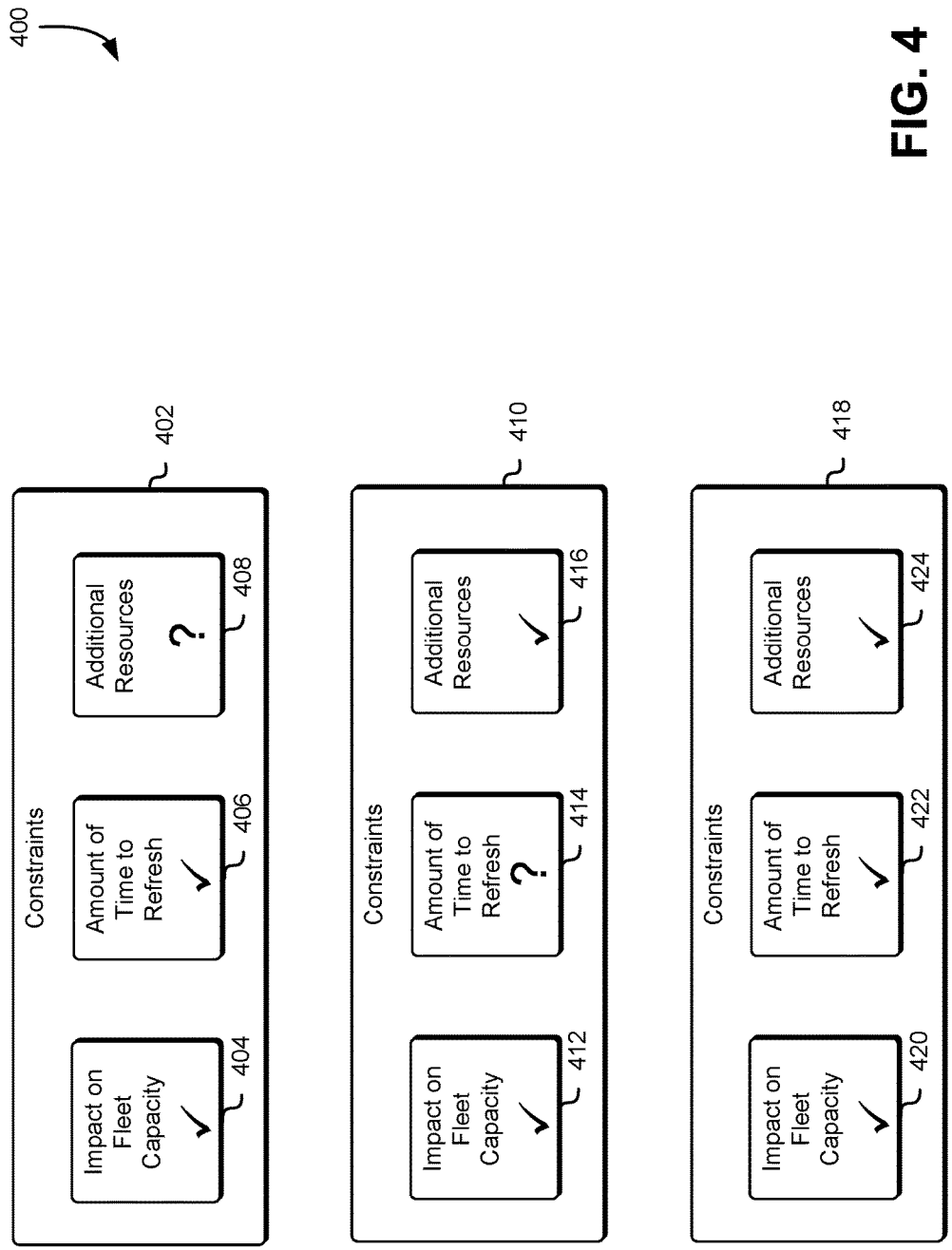
FIG. 4 illustrates an example environment where constraints of a refresh request are analyzed and constraint conflicts are resolved using instance refresh service.

FIG. 4 illustrates an example environment 400 where constraints of a refresh request are analyzed and constraint conflicts are resolved using instance refresh service, as described in connection with FIG. 1, and in accordance with an embodiment. A first set of constraints 402 specifies a constraint 404 on maximum allowable degradation of capacity of the fleet (e.g., that no more than ten percent of the fleet instances can be unavailable at a time), a constraint 406 on an amount of time to refresh (e.g., within five hours), and an unspecified constraint 408 on the amount of additional resources (also referred to herein as "additional computer system resources" or simply as "additional resources"). This first set of constraints 402 specifies that, provided that maximum allowable degradation of capacity of the fleet and the amount of time to refresh is met, any number of additional instances can be added to the fleet.

A second set of constraints 410 specifies a constraint 412 on maximum allowable degradation of capacity (e.g., that no more than ten percent of the fleet instances can be unavailable at a time), an unspecified constraint 414 on an amount of time to refresh, and a constraint 416 on the amount of additional resources (e.g., that no new resources can be added). This second set of constraints 410 specifies that, provided that the maximum allowable degradation of capacity of the fleet and that no new resources are added, the instance refresh service, any amount of time can be used to complete the refresh (e.g., hours, days, or even weeks).

A third set of constraints 418 specifies a constraint 420 on maximum allowable degradation of capacity of the fleet (e.g., that no more than ten percent of the fleet instances can be unavailable at a time), a constraint 422 on an amount of time to refresh (e.g., within five hours), and a constraint 424 on the amount of additional resources (e.g., that no new resources can be added). This third set of constraints 418 specifies that the maximum allowable degradation of capacity and the amount of time to refresh is met without adding any additional instances to the fleet. This third set of constraints 418 may be difficult to satisfy (i.e., there may be constraint conflicts when trying to complete the refresh request that specifies this third set of constraints 418).

Figure 5:
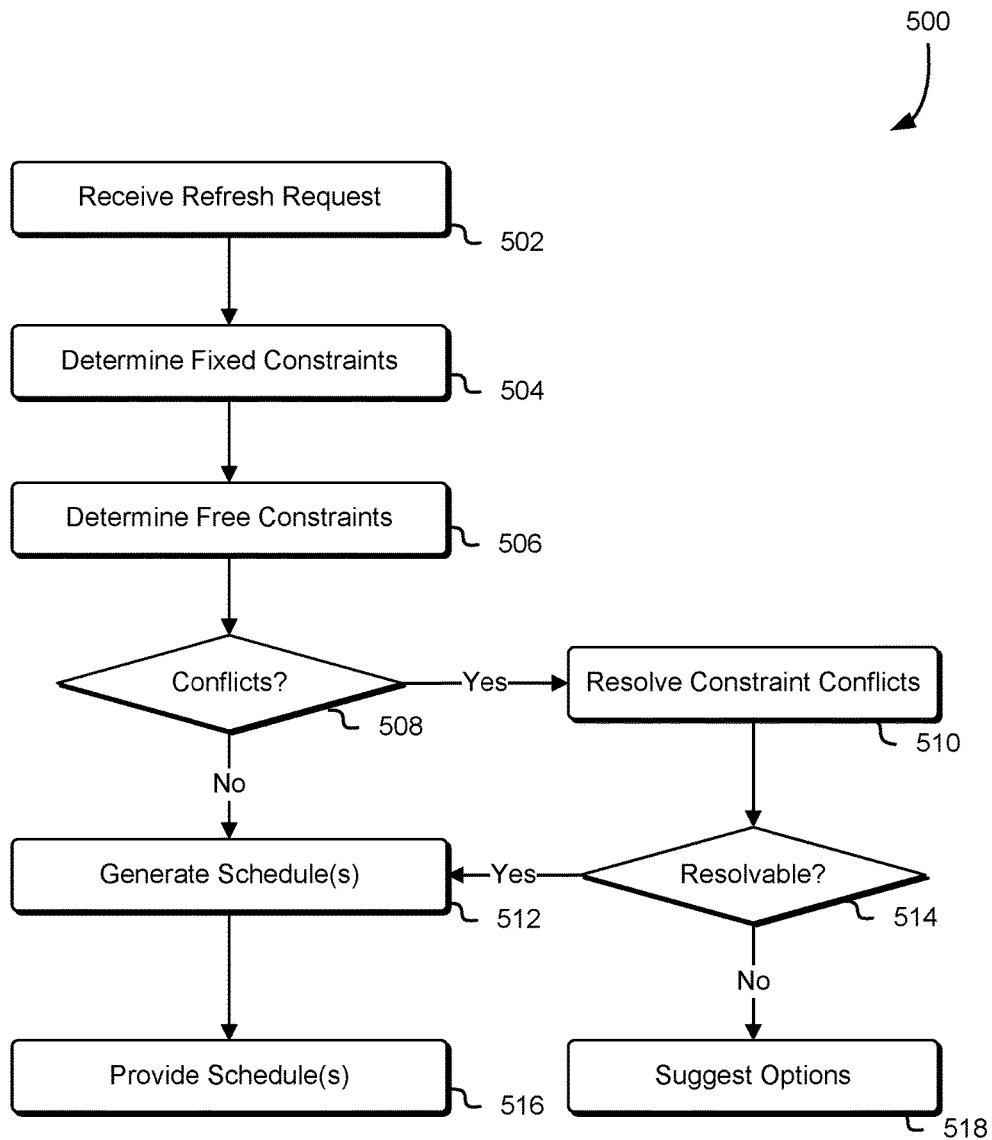
FIG. 5 illustrates an example process for resolving constraint conflicts of a refresh request using an instance refresh service.

FIG. 5 illustrates an example process 500 for resolving constraint conflicts of a refresh request using an instance refresh service, as described in connection with FIG. 1, and in accordance with an embodiment. An instance refresh service, such as the instance refresh service 106 described in connection with FIG. 1, may perform the example process 500 illustrated in FIG. 5. The impact refresh service may first receive 502 a refresh request as described above. The impact refresh service may then determine 504 whether there are any fixed constraints (i.e., any constraints that are set such as the constraint 424 on the amount of additional resources that specifies no new resources can be added, described above in connection with FIG. 4) associated with the refresh request. The impact service may then determine 506 whether there are any free constraints (i.e., any constraints that are not set such as the unspecified constraint 408 on the amount of additional resources, described above in connection with FIG. 4) associated with the refresh request.

The instance refresh service may next determine 508 whether there are any conflicts in the constraints associated with the request such as, for example, when it is not possible to satisfy all of the constraints for the refresh request because, for example, there is too little time or not enough resources. If the instance refresh service does not determine 508 that there are any conflicts, the instance refresh service may generate 512 one or more schedules and may provide 516 the one or more schedules to the customer for selection.

Conversely if the instance refresh service does determine 508 that there are conflicts, the instance refresh service may first try to resolve 510 the constraint conflicts by relaxing one or more of the constraints. The instance refresh service may then determine 514 whether the constraint conflicts are resolvable by relaxing one or more of the constraints. If the instance refresh service does determine 514 that the constraint conflicts are resolvable by relaxing one or more of the constraints, the instance refresh service may generate 512 one or more schedules and may provide 516 the one or more schedules to the customer for selection. If the instance refresh service does not determine 514 that the constraint conflicts are resolvable by relaxing one or more of the constraints, the instance refresh service may suggest 518 options to the customer such as, for example, removing one or more of the constraints.

Figure 6:
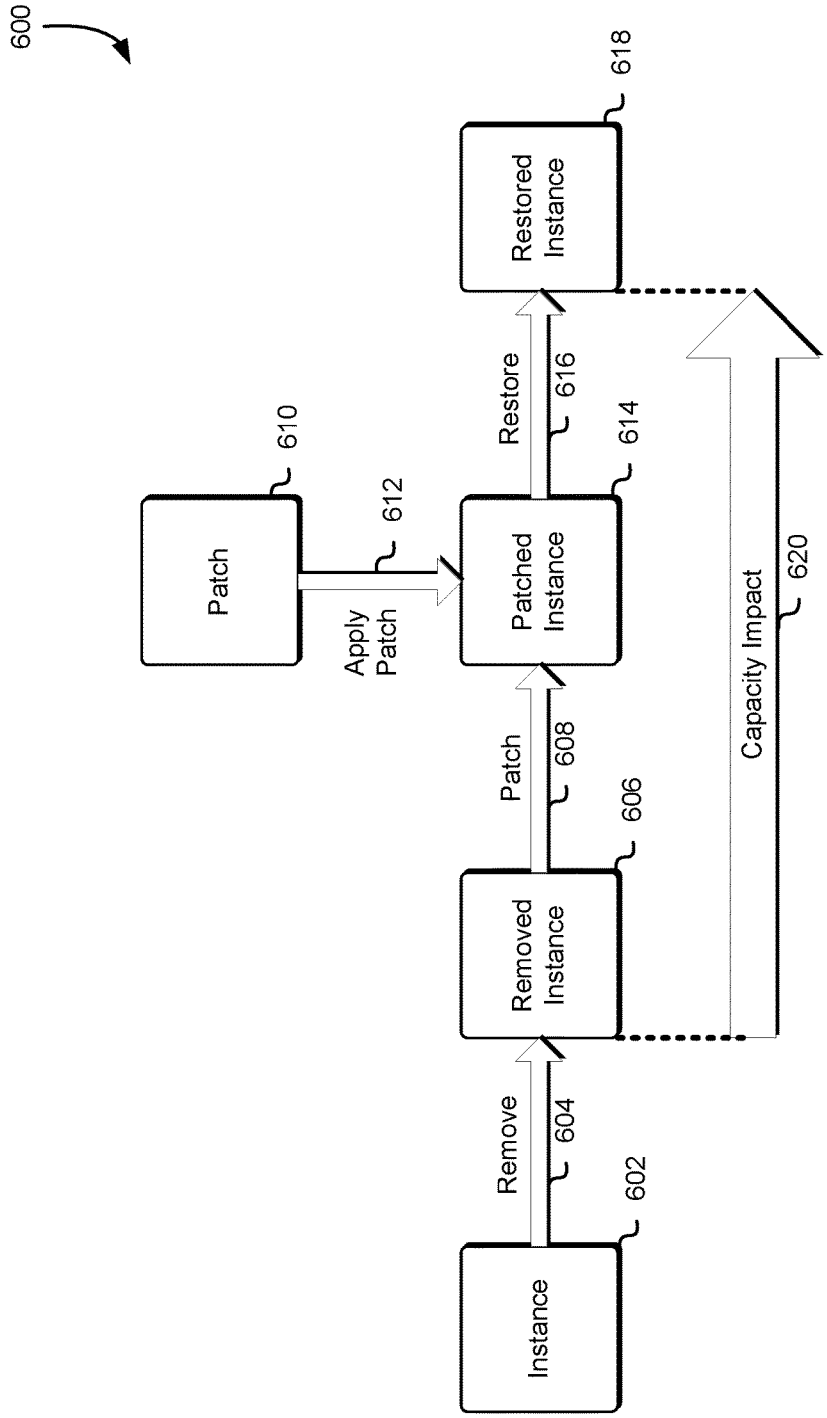
FIG. 6 illustrates an example environment where an impact of a patch operation is determined using an instance refresh service.

FIG. 6 illustrates an example environment 600 where an impact of a patch operation is determined using an instance refresh service, as described in connection with FIG. 1, and in accordance with an embodiment. In the example environment 600 illustrated in FIG. 6, a virtual machine instance 602 is selected for an instance refresh operation. The instance refresh operation is, for example, a virtual machine instance patch operation. The virtual machine instance patch operation is a refresh operation where a patch is applied to an application running on a virtual machine instance. A virtual machine instance patch operation may be performed without rebooting the virtual machine instance. A virtual machine instance patch operation may also involve rebooting the virtual machine instance when, for example, the virtual machine instance patch operation is a patch to the operating system kernel of the operating system of the virtual machine instance.

In the example environment 600 illustrated in FIG. 6, the virtual machine instance patch operation does not involve rebooting the virtual machine instance 602 and, instead, the instance is removed 604 from the fleet by, for example, temporarily disabling network access to the instance so that other instances may not access the instance. When the instance is removed 604, other instances of the fleet may not access the removed instance 606 so that, for example, it may be patched without intervening state changes. Users also may not be able execute processes or applications on the removed instance 606 including, but not limited to, processes or applications that interact with, or otherwise alter the state of, the removed instance 606. When the instance is removed 604, a capacity impact 620 begins because, with the removed instance 606 not being available, the capacity of the removed instance 606 is effectively lost.

After the instance is removed 604, the removed instance 606 is patched 608 by applying 612 the patch 610 to the removed instance 606 to produce the patched instance 614. The patched instance is then restored 616 (i.e., restoring network access to the instance so that other instances may access the instance) so that users of the restored instance 618 may once again execute processes or applications. After the patched instance 614 is restored 616, the capacity impact 620 ends because the capacity that was previously lost due to the removal has been restored.

Figure 7:
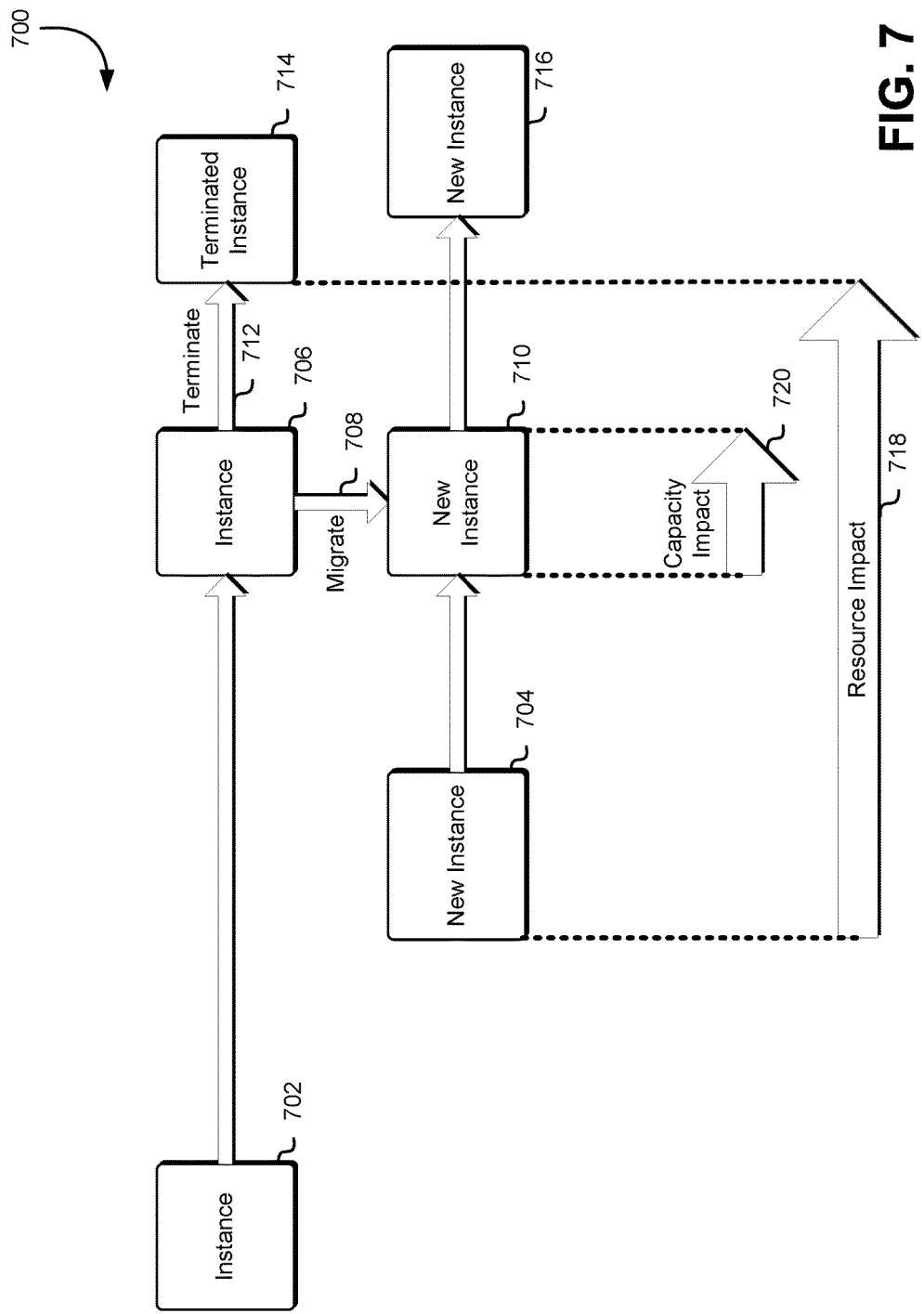
FIG. 7 illustrates an example environment where impacts of a virtual machine instance build and user migration operation is determined using an instance refresh service.

FIG. 7 illustrates an example environment 700 where impacts of a virtual machine instance build and user migration operation is determined using an instance refresh service, as described in connection with FIG. 1, and in accordance with an embodiment. In the example environment 700 illustrated in FIG. 7, an instance 702 is selected for an instance refresh operation. The instance refresh operation may be, for example, a virtual machine instance specification change operation. A virtual machine instance specification change operation is a refresh operation where the instance specification for a virtual machine instance is updated. A virtual machine instance specification change operation may, for example, be an operation to install a new version of an operating system on the virtual machine instance. A virtual machine instance specification change operation may be an invasive refresh operation that specifies a reboot of the virtual machine instance in order to complete the virtual machine instance specification change operation.

The instance refresh operation may also be, for example, a virtual machine instance size change operation. A virtual machine instance size change operation is a refresh operation that changes the size (i.e., the type and amount of resources) of a virtual machine instance. For example, a virtual machine instance size change operation may be a refresh operation that changes the particular virtual machine instance from a virtual machine instance with two virtual processors to a virtual machine instance with four virtual processors. Similarly, a virtual machine instance size change operation may be a refresh operation that changes from a virtual machine instance with a virtualized graphics processing unit (a "GPU") to a virtual machine instance that does not have a GPU. A virtual machine instance size change operation is typically an invasive refresh operation that specifies a complete migration of all applications and data of the virtual machine instance to a new virtual machine instance or a reboot of the instance in order to complete the virtual machine instance size change operation.

The instance refresh operation may also be, for example, a virtual machine instance rebuild operation. A virtual machine instance rebuild operation (also referred to herein as a "computer system instance rebuild operation") is a refresh operation that rebuilds a virtual machine instance. The virtual machine instance rebuild operation may rebuild the virtual machine instance from scratch, from a specification, from an image (i.e., a memory snapshot) of a virtual machine instance, from a baseline virtual machine image, or by patching and/or updating a virtual machine image. A virtual machine instance rebuild operation is typically an invasive refresh operation that specifies a reboot of the virtual machine instance in order to complete the virtual machine instance rebuild operation.

The instance refresh operation may also be, for example, a virtual machine instance hardware change operation. A virtual machine instance hardware change operation is a refresh operation where the underlying hardware of a virtual machine instance is updated, altered, or otherwise changed. A virtual machine instance hardware change operation may be performed by provisioning a new server to host virtual machine instances with new hardware and virtual machine instances are shut down on the old hardware and rebooted on the new hardware. For example, a new generation of CPU may be released and a number of host machines (i.e., new servers) may be added to the environment for hosting virtual machine instances. A virtual machine instance hardware change operation is typically an invasive refresh operation that specifies a reboot of the virtual machine instance in order to complete the virtual machine instance hardware change operation. Typically, a virtual machine instance hardware change operation may only be requested by the owner of the hardware that hosts the virtual machine instance. That is, a customer may not be authorized to generate a refresh request for a virtual machine instance hardware change operation if the computing resource service provider provides the hardware where the virtual machine instance is hosted.

If, as in the examples described above, the refresh operation specifies a reboot and/or a complete migration of the virtual machine instance, a new instance 704 is instantiated and provided for use so that the users and applications on the instance 702 can be migrated 708 to the new instance 710. In an embodiment, the new instance is the instance that results from performing the refresh operation (i.e., a virtual machine instance specification change operation, a virtual machine instance size change operation, a virtual machine instance rebuild operation, or a virtual machine instance hardware change operation). In an embodiment, the instance 706 is removed (i.e., access to the instance is disabled) before the migration 708, as described above. In another embodiment, the migration 708 is a live migration of the instance 706 so that, for example, the migration is performed with minimal impact to the execution of the instance.

After the migration 708, the instance 706 may be terminated 712 to produce a terminated instance 714 and the new instance 716 is resumed. In an embodiment, the instance 702 is terminated before the new instance 704 is instantiated and the instance 702 is rebuilt and/or rebooted as the new instance 704. From the time that the new instance 704 is instantiated until the instance 706 is terminated 712, there is a resource impact 718 because, during this time period, there is one extra instance. From the time that the instance 706 is terminated, there is a capacity impact 720 because both the instance 706 and the new instance 710 not available. It should be noted that, in the event of a live migration, the capacity impact 720 is minimal.

Figure 8:
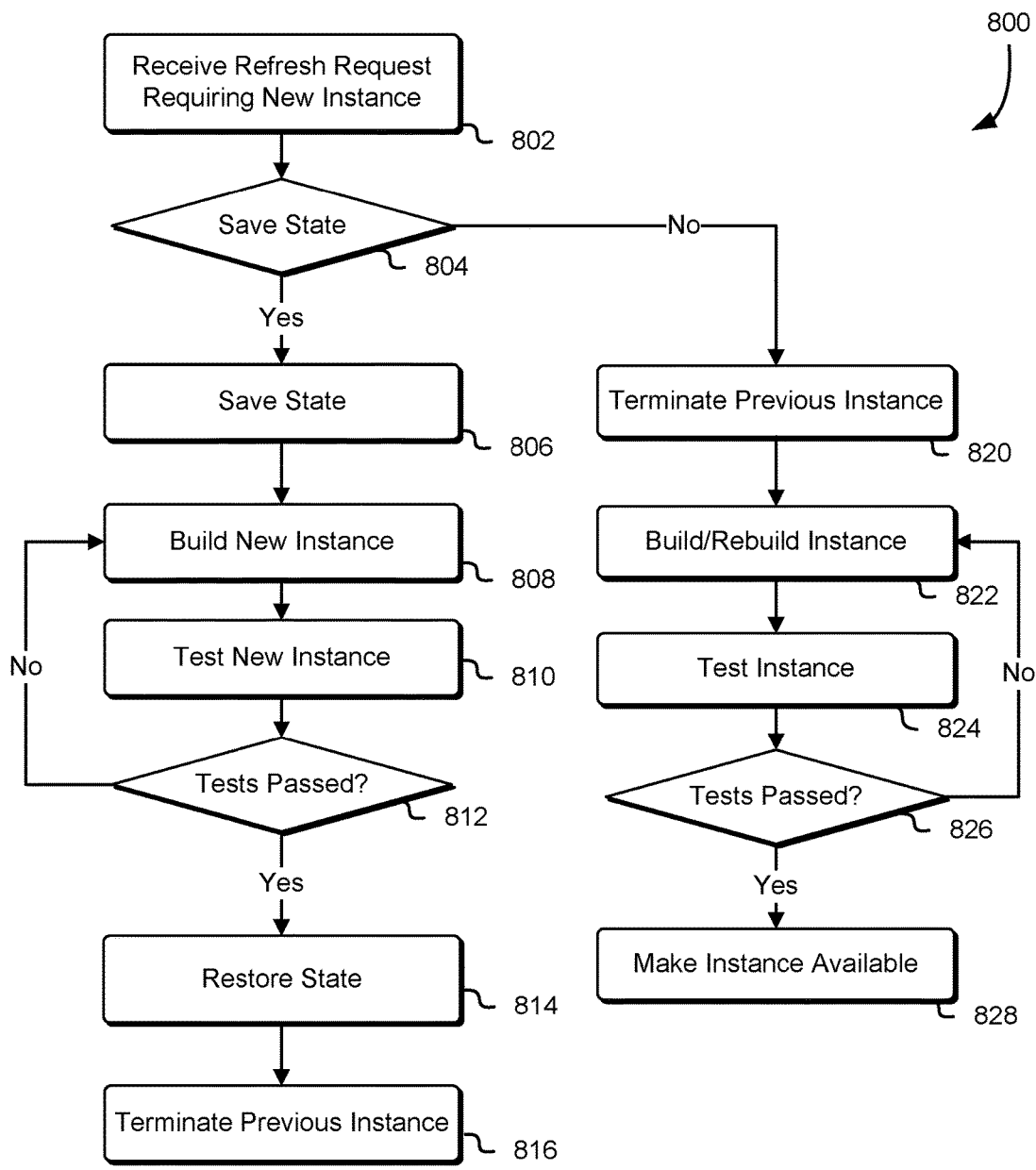
FIG. 8 illustrates an example process for managing the impact of a virtual machine instance build operation using an instance refresh service.

FIG. 8 illustrates an example process 800 for managing the impact of a virtual machine instance build operation using an instance refresh service, as described in connection with FIG. 1, and in accordance with an embodiment. An instance refresh service, such as the instance refresh service 106 described in connection with FIG. 1, may perform the example process 800 illustrated in FIG. 8. The instance refresh service first receives 802 a refresh request with a refresh operation that involves a new instance such as those described above in connection with FIG. 7 (i.e., a virtual machine instance specification change operation, a virtual machine instance size change operation, a virtual machine instance rebuild operation, or a virtual machine instance hardware change operation). The image refresh service may next determine 804 whether to save the state of, for example, any processes that might be impacted by the refresh operation (i.e., if the running instance is executing applications on behalf of users associated with the virtual machine instance). If the image refresh service does determine 804 to save the state of any processes that might be impacted by the refresh operation, the image refresh service may direct the owner of the instance to save 806 the state of those processes, prior to terminating the virtual machine instance. The image refresh service may direct the owner of the instance to save 806 the state of the processes prior to terminating the virtual machine instance by, for example, sending a message or notification to the owner of the instance indicating that the instance is about to be terminated (i.e., that the instance will be terminated in, for example, two minutes). As a result of receiving the message or notification, the owner of the instance may save the state of the instance (i.e., may save the state of the processes running on the instance or may terminate the processes running on the instance so that they save their own state). In an embodiment, an automated process that saves the state may be running on the instance. The automated process may automatically save the state when the message or notification is received.

In an embodiment, the virtual machine instance may be stateless (i.e., a virtual machine instance that does not save the state of any processes running thereon and that, for example, processes transactions as they are received). A stateless virtual machine instance, which may be marked as such by the customer, may not require any state to be saved prior to terminating the instance. After the image refresh service does direct a user or process associated with the user to save 806 the state of those processes, the image refresh service may build 808 a new instance and test 810 the new instance to, for example, ensure that the new instance was built correctly. If the image refresh service determines 812 that the new instance passes the tests, the image refresh service may direct a user or process associated with the user to restore 814 the state of the processes from the previous instance to the new instance and then may terminate 816 the previous instance.

If the instance refresh service does not determine 804 to save the state of processes that might be impacted by the refresh operation, the instance refresh service may terminate 820 the instance, may build or rebuild 822 the instance, as described above, may restart the instance, and may test 824 the instance to, for example, ensure that the new instance was built or rebuilt correctly. If the image refresh service determines 826 that the instance passes the tests, the image refresh service may make 828 the rebuilt instance available for use.

Figure 9:
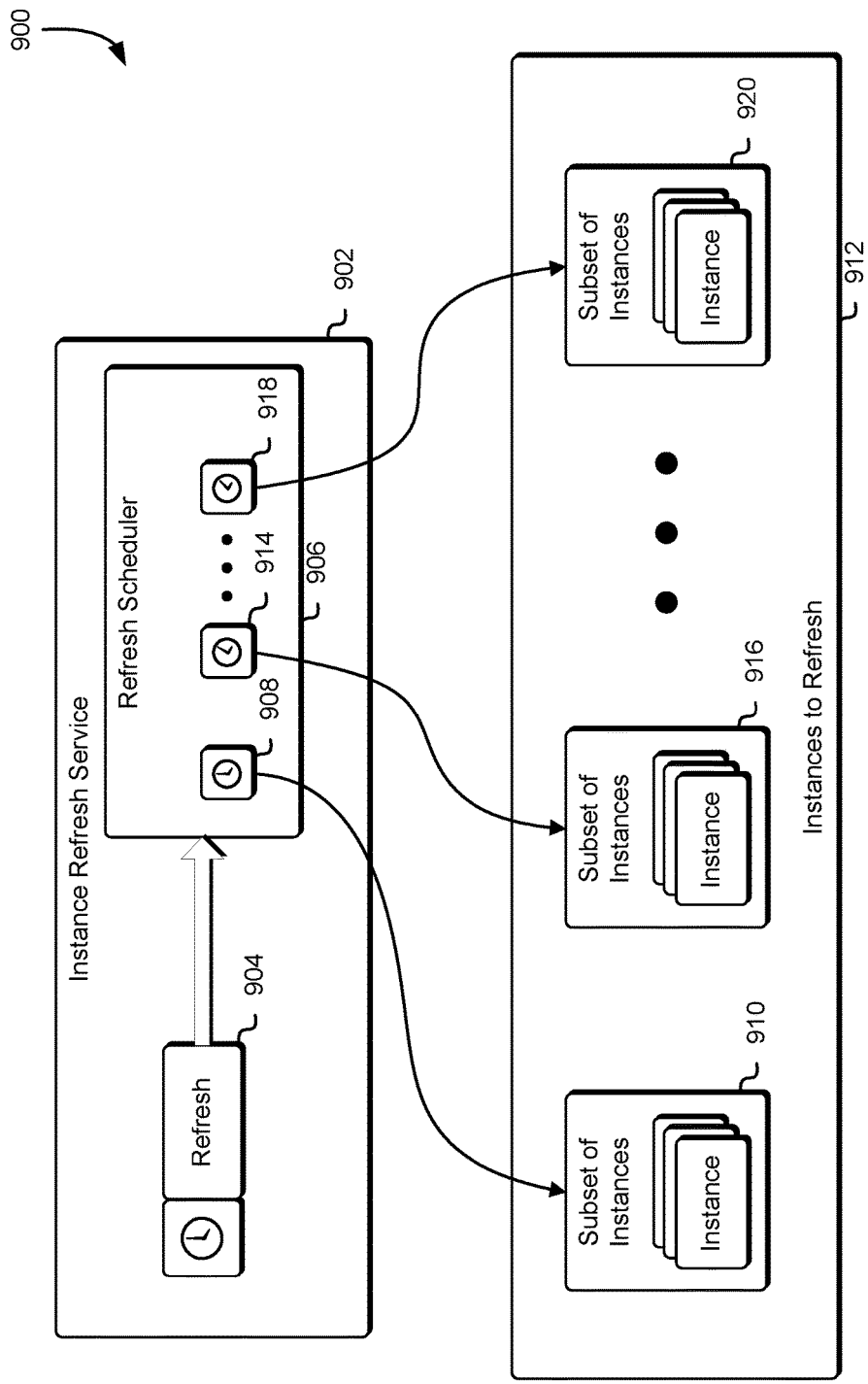
FIG. 9 illustrates an example environment where a refresh operation is scheduled using a refresh scheduler component of an instance refresh service.

FIG. 9 illustrates an example environment 900 where a refresh operation is scheduled using a refresh scheduler component of an instance refresh service, as described in connection with FIG. 1, and in accordance with an embodiment. A set of refresh operations 904, which may be the same as the set of refresh operations 234 described in connection with FIG. 2, is received at an instance refresh service 902. The set of refresh operations 904 may specify a time period to perform the set of refresh operations. The set of refresh operations may then be scheduled by a refresh scheduler 906 so that, at a first time 908, the set of refresh operations are performed on a first subset 910 of the set of instances to refresh 912, at a second time 914, the set of refresh operations are performed on a second subset 916 of the set of instances to refresh 912, and at a third time 918, the set of refresh operations are performed on a third subset 920 of the set of instances to refresh 910.

As an example, if a set of refresh operations includes patching all machines in a fleet over a five hour period with a constraint that no more than ten percent of the instances may be unavailable at any one time, the refresh scheduler may schedule the refresh operation so that, in the first half hour, the first ten percent of the instances are patched, in the second half hour, the second ten percent of the instances are patched, and so on. It should be noted that finer grained scheduling of refresh operations may be performed so that, for example, the first half hour where the first ten percent of the instances are patched, may be further subdivided so that, in the first three minutes, the first one percent of the instances are patched, in the second three minutes, the second one percent of the instances are patched, and so on.

In another example, if a set of refresh operations includes patching all machines in a fleet over a five hour period with a constraint that no more than ten percent of the instances may be unavailable at any one time, the refresh scheduler may schedule the refresh operation so that the first ten percent of the instances are patched initially scheduled for patching and, as the patch operations are completed on those first ten percent of the instances, additional instances can then be scheduled for patching. In an embodiment, the refresh scheduler can monitor the instances of the first ten percent of the instances and wait until all of the first ten percent of the instances have completed the patching operation before scheduling any of the second ten percent of the instances. In another embodiment, the refresh scheduler can schedule additional instances for patching as individual instances complete the patching operation. The refresh scheduler can monitor the individual instances to determine whether they have completed the patching operation and then can schedule the additional individual instances. For example, if there are one-thousand instances in the fleet that are scheduled for patching, the first one-hundred instances may be scheduled for patching initially. As individual instances complete the patching operations and are brought back online, additional instances from the remaining unpatched instances may be scheduled for patching, maintaining the constraint that only ten percent (i.e., one-hundred) of the instances are unavailable at any time during the refresh.

Figure 10:
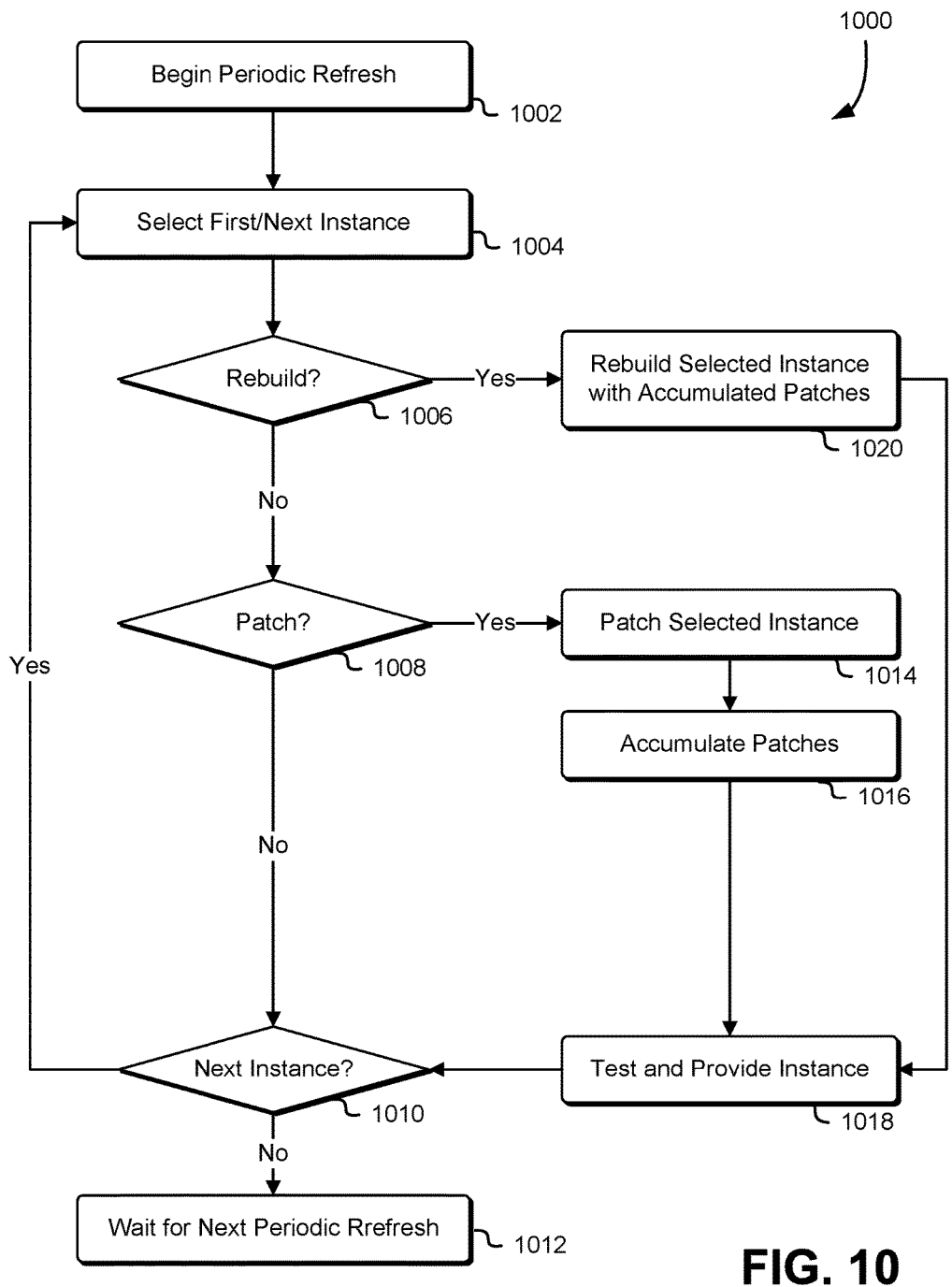
FIG. 10 illustrates an example process for performing periodic refresh operations on a fleet of virtual machine instances using an instance refresh service.

FIG. 10 illustrates an example process 1000 for performing periodic refresh operations on a fleet of virtual machine instances using an instance refresh service, as described in connection with FIG. 1, and in accordance with an embodiment. An instance refresh service, such as the instance refresh service 106 described in connection with FIG. 1, may perform the example process 1000 illustrated in FIG. 10. The instance refresh service may first begin 1002 a periodic refresh (i.e., a refresh operation that is a computer system instance rebuild operation) by selecting 1004 the first candidate instance from the working set of instances (i.e., the set of instances from the fleet that are selected as refresh candidates). The instance refresh service may select the working set of instances based on, for example, an instance type associated with the instance, or a functionality associated with the instance, or using some other selection criteria. The instance type associated with the instance may be based at least in part on a categorization of the hardware or software of the instance. The instance type associated with an instance may also be an arbitrary grouping of instances (i.e., "group one," "group two," "group three," etc.).

The instance refresh service may then determine 1006 whether to perform the computer system instance rebuild operation based on, for example, an elapsed time since the previous computer system instance rebuild operation on that instance. For example, if a customer specifies that each instance in the fleet should be rebuilt every six months, and it has been more than six months since the last time an instance had a refresh operation specifying a computer system instance rebuild operation, then the instance should be refreshed.

If the instance refresh service does not determine 1006 to perform the computer system instance rebuild operation, the instance refresh service may determine 1008 whether to perform a computer system instance patch operation (also referred to herein as a "virtual machine instance patch operation" as described above) to patch one or more applications on the instance. If the instance refresh service does determine 1008 to perform a computer system instance patch operation, the instance refresh service may cause 1014 the selected instance to be patched, may accumulate 1016 the patches into a patch list, and may test 1018 and provide the instance as described above. The instance refresh service may then determine 1010 whether there are any remaining instances to process and, if not, will wait 1012 for the next periodic refresh (e.g., tomorrow's periodic refresh).

If the instance refresh service does determine 1006 to perform the computer system instance rebuild operation, the instance refresh service may cause 1020 the selected instance to be rebuilt by, in an embodiment, applying the accumulated patches. The instance refresh service may then test 1018 and provide the instance as described above. The instance refresh service may then determine 1010 whether there are any remaining instances to process and, if there are remaining instances to process, the instance refresh service will process the next instance. If there are not remaining instances to process, the instance refresh service will wait 1012 for the next periodic refresh (e.g., tomorrow's periodic refresh).

Finally, if the instance refresh service does not determine 1008 to perform a computer system instance patch operation, the instance refresh service may then determine 1010 whether there are any remaining instances to process and, if not, will wait 1012 for the next periodic refresh (e.g., tomorrow's periodic refresh).

Figure 11:
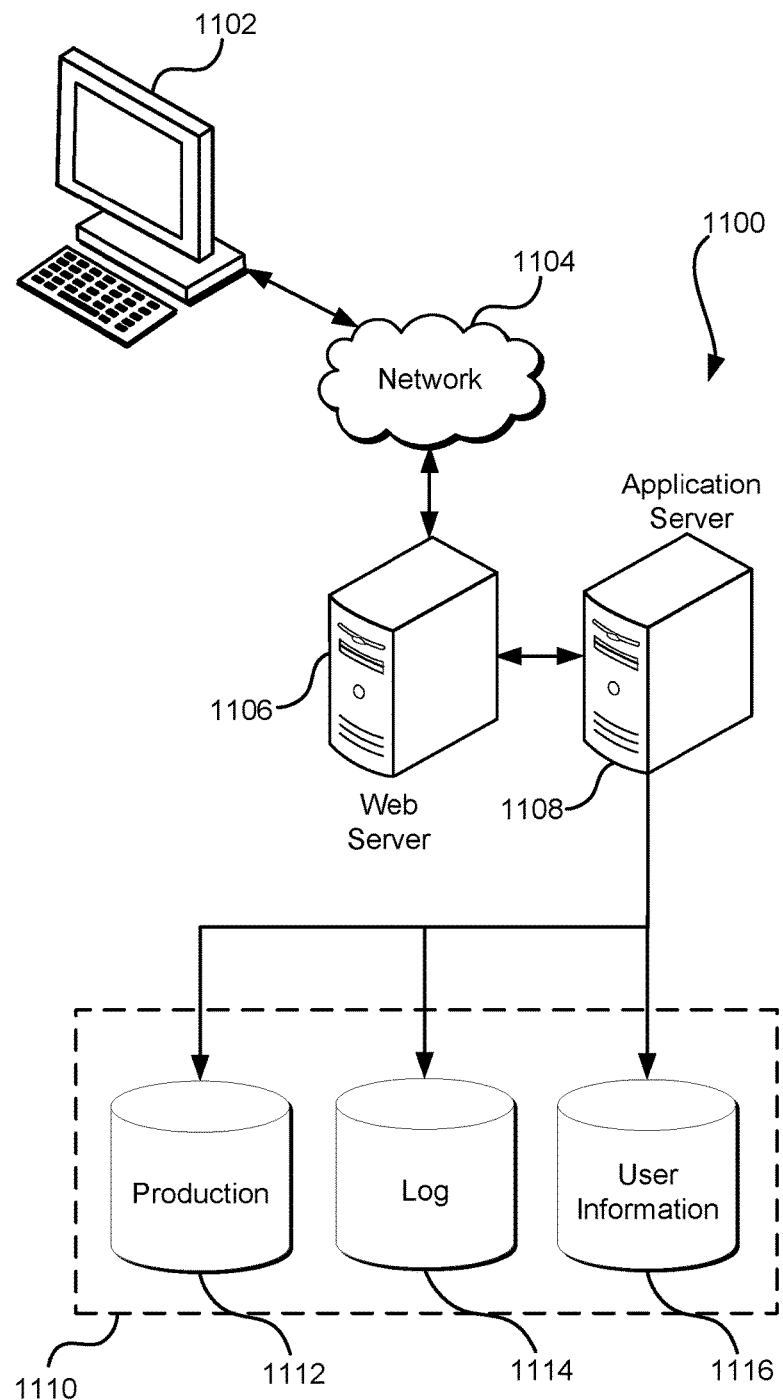
FIG. 11 illustrates an environment in which various embodiments can be implemented.

FIG. 11 illustrates an example process 1100 for refreshing a fleet of virtual machine instances using an instance refresh service, as described in connection with FIG. 1, and in accordance with an embodiment. An instance refresh service, such as the instance refresh service 106 described in connection with FIG. 1, may perform the example process 1100 illustrated in FIG. 11. The instance refresh service may first receive 1102 an API request to refresh computer system instances in a fleet of instances, the API request specifying a set of instances to refresh and a set of constraints on performing refresh operations on those instances. The instance refresh service may next determine 1104 a set of impact values associated with the constraints and, from the set of impact values, may determine 1106 a set of schedules for performing the refresh operations. The instance refresh service may then provide 1108 the set of schedules, receive 1110 a selected schedule from the set of schedules, and perform 1112 the refresh operations in accordance with the selected schedule.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
under control of one or more computer systems configured with executable instructions,
receiving, from a customer device of a customer of a computing resource service provider, an application programming interface request to perform a refresh operation for a fleet of computer system instances of the customer, the request specifying a set of computer system instances in the fleet and a set of constraints for performing the refresh operation;
analyzing the request to determine, based at least in part on the set of constraints, a set of impact values, wherein an individual impact value of the set of impact values indicates an impact of performing the refresh operation on capacity of the fleet, an amount of time to perform the refresh operation, or an amount of additional resources utilized to perform the refresh operation in accordance with the set of constraints;
determining, based at least in part on the set of impact values, a set of schedules for performing the refresh operation;
providing the set of schedules to the customer device;
receiving, from the customer device, information indicating a selected schedule from the set of schedules; and
performing the refresh operation in accordance with the selected schedule.

2. The computer-implemented method of claim 1, wherein the refresh operation comprises at least one of: a virtual machine instance patch operation, a virtual machine instance specification change operation, a virtual machine instance size change operation, a virtual machine instance rebuild operation, or a virtual machine instance hardware change operation.

3. The computer-implemented method of claim 1, wherein the computer system instances are virtual computer system instances managed by a virtual computer system service of the computing resource service provider.

4. The computer-implemented method of claim 1, wherein the additional resources are additional computer system resources to be provisioned to prevent a degradation of capacity of the fleet.

5. A system, comprising:
one or more processors; and
memory storing instructions that, as a result of execution by the one or more processors, cause the system to:
receive an application programming interface request to perform a refresh operation, the request specifying a set of computer system instances and a set of constraints for performing the refresh operation;
analyze the request to determine, based at least in part on the set of constraints, a set of impact values for performing the refresh operation for the set of computer system instances;
determine, based at least in part on the set of impact values, a set of schedules for performing the refresh operation; and
provide the set of schedules for selection.

6. The system of claim 5, wherein the instructions include instructions that, as a result of execution by the one or more processors, cause the system to:
receive a schedule selected from the set of schedules;
determine, based at least in part on the schedule and the set of constraints, a first subset of the set of computer system instances;
begin the refresh operation on each computer system instance of the first subset of the set of computer system instances; and
for each computer system instance of the first subset of the set of computer system instances:
monitor the computer system instance to determine whether the refresh operation has completed; and
begin the refresh operation on a computer system instance of a second subset of the set of computer system instances, the second subset different than the first subset.

7. The system of claim 5, wherein the set of computer system instances is hosted by a customer of a computing resource service provider.

8. The system of claim 5, wherein the computer system instances are virtual machine instances managed by a virtual computer system service of a computing resource service provider.

9. The system of claim 5, wherein the refresh operation is a virtual machine instance patch operation, the virtual machine instance patch operation specifying instructions that, as a result of execution by the one or more processors, cause the system to, for each computer system instance of the set of computer system instances:
disable network access to the instance;
apply a patch to the instance, the patch specified in the refresh operation; and
restore network access to the instance.

10. The system of claim 5, wherein the refresh operation is a virtual machine instance patch operation, the virtual machine instance patch operation specifying instructions that, as a result of execution by the one or more processors, cause the system to, for each computer system instance of the set of computer system instances:
save a state of the instance;
instantiate a new instance based at least in part on an instance specification specified in the refresh operation;
apply the state to the new instance; and
terminate the instance.

11. The system of claim 5, wherein the set of impact values includes an impact value indicating an amount of additional resources utilized to perform the refresh operation in accordance with the set of constraints.

12. The system of claim 5, wherein the instructions further include instructions that, as a result of execution by the one or more processors, cause the system to perform the refresh operation in accordance with a schedule selected from the set of schedules.

13. A non-transitory computer-readable storage medium having stored thereon executable instructions that, as a result of being executed by one or more processors of a computer system, cause the computer system to at least:
determine, based at least in part on a set of constraints, a set of impact values for performing a refresh operation for a set of computer system instances;
determine, based at least in part on the set of impact values, a set of schedules for performing the refresh operation, the set of schedules comprising a first schedule for a first way of performing the refresh operation for the set of computer system instances and a second schedule for a second way of performing the refresh operation for the set of computer system instances; and
provide the set of schedules for selection.

14. The non-transitory computer-readable storage medium of claim 13, wherein the second schedule is produced from the first schedule by relaxing one or more constraints of the set of constraints.

15. The non-transitory computer-readable storage medium of claim 13, wherein an individual impact value of the set of impact values indicates an impact of performing the refresh operation on capacity the set of computer system instances, an amount of time to perform the refresh operation, or an amount of additional resources utilized to perform the refresh operation in accordance with the set of constraints.

16. The non-transitory computer-readable storage medium of claim 13, wherein:
the refresh operation is a computer system instance rebuild operation; and
the set of computer system instances is selected from a fleet of computer system instances based at least in part on an elapsed time since a previous computer system instance rebuild operation was performed on the computer system instances of the set of computer system instances.

17. The non-transitory computer-readable storage medium of claim 13, wherein the set of computer system instances is selected from a fleet of computer system instances based at least in part on an instance type associated with the computer system instances.

18. The non-transitory computer-readable storage medium of claim 13, wherein the set of computer system instances is selected from a fleet of computer system instances based at least in part on a corresponding state associated with each computer system instance of the set of computer system instances.

19. The non-transitory computer-readable storage medium of claim 13, wherein the executable instructions further include executable instructions that, as a result of being executed by one or more processors of a computer system, cause the computer system to at least:
receive a schedule selected from the set of schedules;

perform the refresh operation on a first subset of the set of computer system instances, the first subset based at least in part on the schedule; and perform the refresh operation on a second subset of the set of computer system instances, the second subset based at least in part on the schedule, the second subset different than the first subset.

20. The non-transitory computer-readable storage medium of claim 13, wherein the set of constraints includes a cost constraint, the cost constraint specifying a maximum resource cost of additional resources utilized to perform the refresh operation in accordance with the set of constraints.

\* \* \* \* \*